Figure 1:
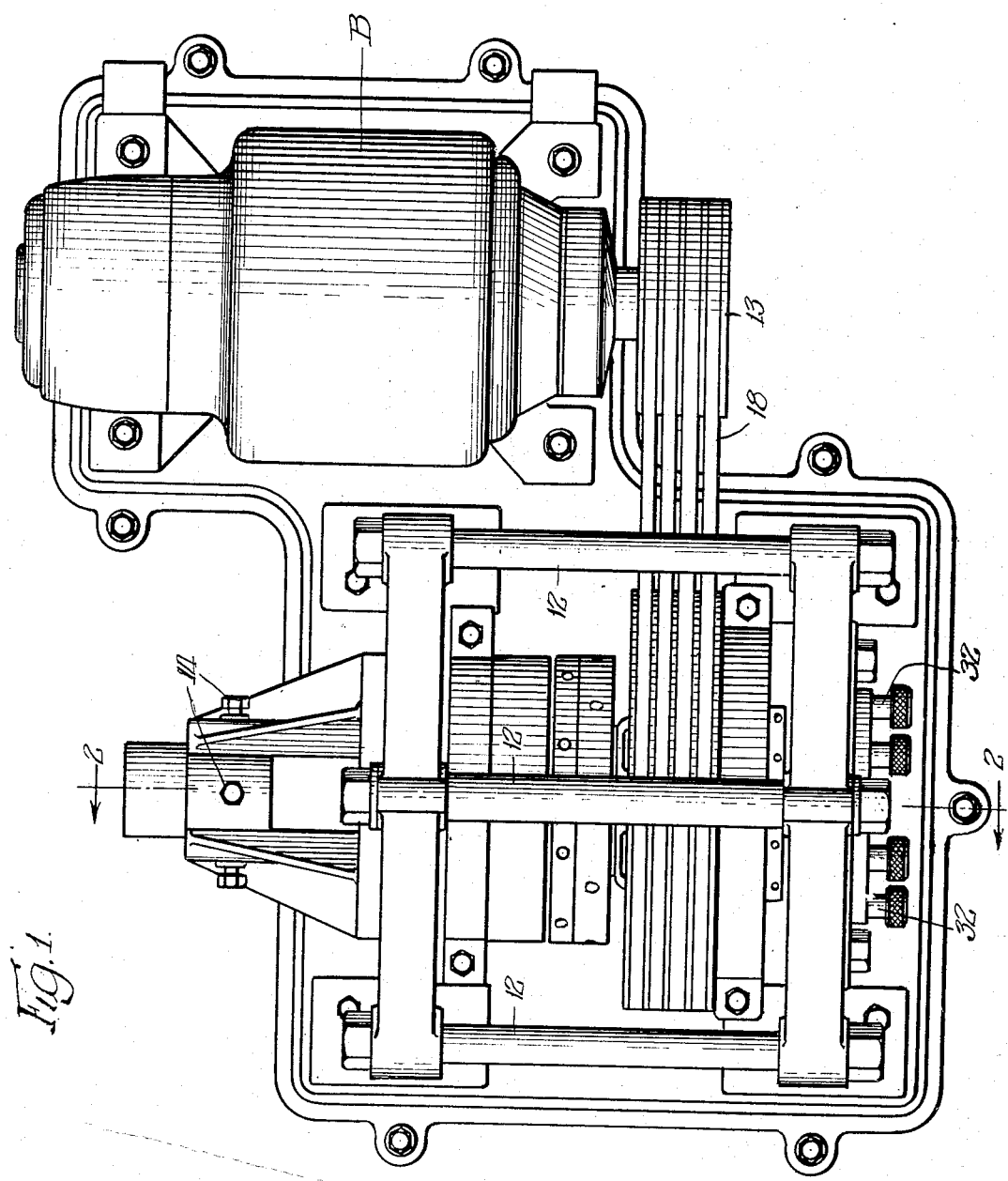

Dec. 28, 1943.     K. SCHULTZ     2,337,775

MANUFACTURE OF SAUSAGE CASINGS AND THE LIKE

Filed April 25, 1941     2 Sheets—Sheet 1

INVENTOR.
Kristian Schultz,
BY Carl C. Batz
atty.

Dec. 28, 1943. K. SCHULTZ 2,337,775
MANUFACTURE OF SAUSAGE CASINGS AND THE LIKE
Filed April 25, 1941 2 Sheets-Sheet 2
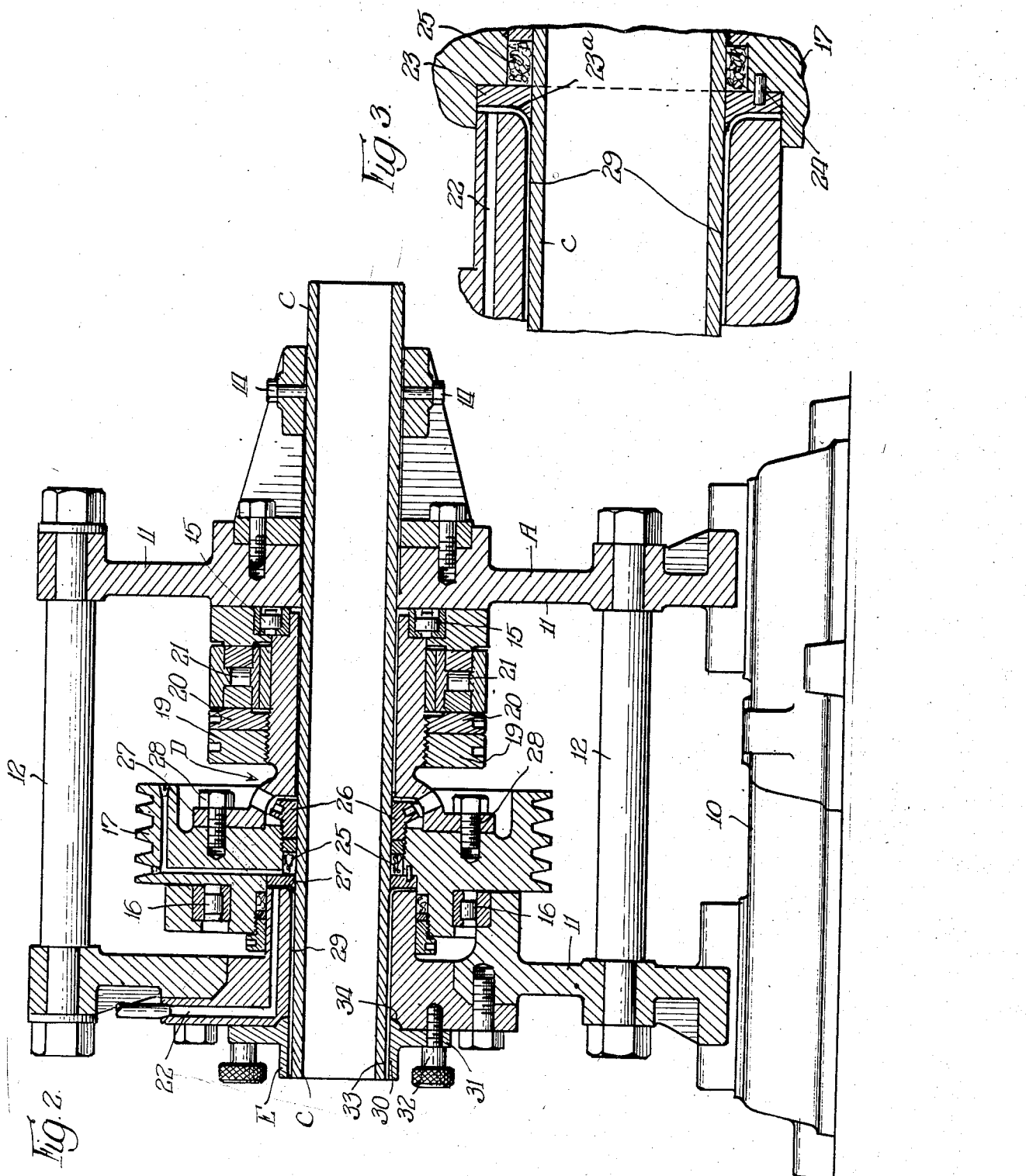

Patented Dec. 28, 1943

2,337,775

UNITED STATES PATENT OFFICE 2,337,775

MANUFACTURE OF SAUSAGE CASINGS AND THE LIKE

Kristian Schultz, Chicago, Ill., assignor to Armour and Company, Chicago, Ill., a corporation of Illinois Application April 25, 1941, Serial No. 390,293

10 Claims. (Cl. 18—14)

This invention relates to the manufacture of sausage casings and artificial casings for all the purposes to which such casings are and may be put.

In the manufacture of casings from various materials, such as sinews, tendons, and other materials from animal sources, as well as from other fibrous material, considerable difficulty has been experienced because of the tendency of fibers to form in certain prearranged order, causing the material to tear or split along weakened lines. Further, in the discharge of the casings from the forming chamber, it has been extremely difficult to provide an adjustment meeting the requirements of the specific material passing through the apparatus so as to produce a uniform product.

An object of the present invention is to provide means for forming a casing wherein the tendency to split certain areas is eliminated and a satisfactory and uniform structure produced. Another object is to provide a control means at the discharge end of the forming chamber or passage whereby adjustments can be made during the operation of the machine to meet the varying requirements of the material being fed through and to constantly bring about the desired alignment of the discharge passage with the remaining forming passages of the apparatus. A further object is to provide means whereby the annular chamber employed may be constantly changed or adjusted to give the desired quality of product. Other specific objects and advantages will appear as the specification proceeds.

The invention is illustrated, in a preferred embodiment, by the accompanying drawings, in which—

Figure 1 is a top plan view of apparatus embodying my invention; Fig. 2, a longitudinal sectional view, the section being taken as indicated at line 2—2 of Fig. 1; and Fig. 3, an enlarged detail sectional view showing the annular chamber illustrated in Fig. 2.

In the illustration given, A designates a base and frame or casing; B, a motor; C, a main shaft supported by the casing; D, a rotatable member driven by the motor; and E, a control cap at the discharge end of the machine.

The casing A may be of any suitable construction. In the illustration given, there is provided a base 10. A plurality of arms or standards 11 for supporting the central member extend on opposite sides of the central portion of the casing, and these members are connected by shafts 12. The motor B is also supported by the casing A and drives a pulley wheel 13.

The central portion of the casing A is perforated to receive the fixed shaft or tubular member C, and adjustment screws 14 are employed to lock the casing thereon.

In the rear portion of the casing are provided the roller bearings 15 and in the forward portion of the casing are provided the roller bearings 16. Upon these bearings, the portion D rotates, being driven by a pulley member 17. Belts 18 connect the pulley 17 with the motor pulley 13. Adjustment members 19 and 20 threadedly engage the member D and when rotated on the member D so as to be urged against the fixed roller bearing member 21 are adapted to draw the entire member D in a forward direction to control the size of the annular chamber later described.

The forward end of the casing A provides an inlet passage 22 which opens into an annular chamber formed by the casing and the member D. This chamber is shown more clearly in Figure 3. The member D is provided at its forward end with an inset disk or ring portion 23 keyed by member 24 to the pulley structure 17. The packing 25 is preferably employed at the rear of the member 23 and this is held in place by adjustable nut members 26.

The pulley 17 forms a part of the member D and is secured thereto by flange arms 27 provided with bolts 28.

The casing A at its forward end provides between it and the central shaft C an annular passage 29. At the forward or discharge end of the passage 29, the outer portion of the casing is cut away to receive the control cap E.

The control cap E comprises a central sleeve member 30 equipped with outwardly-extending arms 31, each of the arms being provided with adjustment screws 32 which threadedly engage tapped openings in the casing. The tubular member E provides between it and the shaft C an annular discharge passage 33, which is a continuation of passage 29. It will be noted that the inner end of the member E is provided with a rounded portion 34 received within a concave seat provided by the casing, thus providing a ball and socket joint.

Operation

In the practice of the invention, the material to be extruded is first formed into a plastic mass. Though any suitable material may be used, the method is here described in connection with animals' sinews, tendons, hides, etc. For example, if animal tendons are used, they may be dried, hammered, shredded, and carded, and then mixed with water and glycerine. This mass may be mixed with acid and kneaded into a highly plastic mass.

The material is passed under very high pressure into the passage 22 and thence into the annular chamber 23ª provided between the casing and the disk member 23. The annular chamber thus formed has for its forward face a stationary wall provided by the casing A, and for its rear face a rotatable wall provided by the disk 23. The material is forced through the annular chamber 23ª and then discharged through the annular passages 29 and 33. The disk 23 may be rotated at a speed of 30 R. P. M., or at any other desired speed. It will be understood that the speed will have to be varied to meet the requirements of the material being fed. The fibers within the material, as it is fed into the annular chamber 23ª, are directed by the rotating disk 23 into an oblique position, and since the forward end of the chamber is stationary, while the rear end portion thereof rotates, there is a tendency for portions of the obliquely-disposed fibers to interlace. There is thus formed about the entire annular chamber, a great body of fibers curved in a somewhat spiral or oblique position and which, when they enter the passage 29, have portions interlaced. While the outer and inner fibers of the tubular casing formed in the passage 29 may be somewhat changed by friction with the walls, the inner core remains a mass of obliquely-disposed or spiral fibers with portions thereof interlaced. Such a core prevents the tearing or splitting of the casing at any transverse point and gives the casing a uniform strength throughout against bursting or tearing.

The size of the annular chamber 23ª is regulated by the adjustment members 19 or 20 which may be rotated to advance or retract the member 23.

Considerable difficulty has heretofore been experienced at the discharge end of the nozzle due to the effect of several forces and due to the changing characteristics of the material undergoing treatment. Sometimes the casing tends to curve suddenly to the right or left and this may be due to irregularities in the material. The casing, as a result, is somewhat defective. I have found that by means of the control cap E, prompt adjustments can be made, and a nice control maintained at the discharge end of the apparatus so that the casing being discharged falls in the desired position and is uniform in character.

In the resulting product, while there are fibers on the inner and outer surfaces which run lengthwise of the casing, the core itself consists of a sturdy union of fibers which lie in a diagonal or oblique position with respect to the longitudinal axis of the casing and many of which have interlaced portions which give the casing a uniform strength throughout against splitting or tearing. Such a core formed by the bringing together of a great number of obliquely-positioned fibers between surfaces, one of which is moving and one of which is stationary, is believed not to be found in any product heretofore produced and I believe that it possesses advantages, as above described, making it superior to such earlier products.

While in the foregoing description, I have set forth specific illustrations and specific details of structure, it will be understood that wide variations may be made therein by those skilled in the art without departing from the spirit of my invention. The apparatus itself may obviously be modified in a great many parts without changing the underlying idea of the invention disclosed.

I claim:

1. In apparatus of the class set forth for forming tubular casings from plastic material, a casing providing an inlet passage, a forming disk, means for supporting said disk for rotation adjacent said inlet passage, said disk forming with said casing an annular chamber, and an annular nozzle angularly disposed with respect to said chamber but communicating throughout with said annular chamber and forming a continuation thereof.

2. In apparatus of the class set forth for forming tubular casings from plastic material, a casing providing an inlet passage, a forming disk, means for supporting said disk for rotation adjacent said inlet passage, said disk forming with said casing an annular chamber, one wall of which is stationary and provided by said casing and another wall of which is provided by said rotating disk, means for rotating said disk, and an angularly disposed annular outlet nozzle communicating throughout with said annular chamber.

3. In apparatus of the class set forth for forming tubular casings from plastic material, a casing providing an inlet passage, a forming disk, means for supporting said disk for rotation adjacent said inlet passage, said disk forming with said casing an annular chamber, one wall of which is stationary and provided by said casing and another wall of which is provided by said rotating disk, means for rotating said disk, an angularly disposed annular outlet nozzle communicating throughout with said annular chamber, and means for adjusting the position of said disk with respect to said casing wall to vary the size of said annular chamber.

4. In apparatus of the class set forth for forming tubular casings from plastic material, a casing providing an inlet passage, a forming disk, means for supporting said disk for rotation adjacent said inlet passage, said disk forming with said casing an annular vertical chamber, one wall of which is stationary provided by said casing and another wall of which is provided by said rotating disk, and an inner annular discharge passage communicating through an angular bend with the inner end of said annular chamber and forming a passage substantially at right angles to said annular chamber.

5. In apparatus of the class set forth for forming tubular casings from plastic material, a casing providing an inlet passage, a forming disk, means for supporting said disk for rotation, said disk forming with said casing an annular chamber into the upper end of which said inlet passage opens, means for rotating said disk, and an outlet annular passage provided by said casing and communicating with the inner end of said annular chamber along an angular bend, said disk and said casing providing a curved passage between said annular chamber and said annular discharge passage.

6. In apparatus of the class set forth for forming tubular casings from plastic material, a casing providing an inlet passage, structure providing with said casing an annular forming passage communicating with said inlet, and a discharge control cap associated with said forming passage and comprising a sleeve member providing with said casing the outer wall of said forming passage at the discharge end thereof, said cap being mounted for angular movement with respect to the inner wall provided by said casing at said discharge end.

7. In apparatus of the class set forth for forming tubular casings from plastic material, a casing providing an inlet passage, structure providing with said casing an annular forming passage communicating with said inlet, and a discharge control cap associated with said forming passage and forming with said casing a discharge passage forming a continuation of said forming passage, said discharge control cap comprising a sleeve member spaced from an inner wall provided by said casing and having its inner end portion mounted in a ball-and-socket relation with said casing.

8. In apparatus of the class set forth for forming tubular casings from plastic material, a casing providing an inlet passage, structure providing with said casing an annular forming passage communicating with said inlet, a discharge control cap associated with said forming passage and forming with said casing a discharge passage forming a continuation of said forming passage, said discharge control cap comprising a sleeve member spaced from an inner wall provided by said casing and having its inner end portion mounted in a ball-and-socket relation with said casing, and adjustment screws carried by said cap and engaging said casing for moving said cap with respect to said casing.

9. In a method for forming tubular casings from plastic material, the steps of forming a plastic fibrous mass into an annular body having a radial depth greater than the length thereof along the axis of the annulus, passing the material of said body radially inwardly while subjecting the ends of said body to frictional kneading action along arcuate lines about said axis to align the bulk of the fibers in the mass along arcuate lines about said axis, and passing the material from substantially the entire inner periphery of said body in a direction normal to the radius of the body and parallel to said axis to form a long thin wall tubular casing about said axis while subjecting the inner and outer walls of the casing to longitudinal frictional action to longitudinally align the fibers on the inner and outer surface of the casing.

10. In a method for forming tubular casings from plastic material, the steps of forming a plastic fibrous mass into an annular body having a radial depth greater than the length thereof along the axis of the annulus, passing the material of said body radially inwardly while subjecting the ends of said body to frictional kneading action along arcuate lines about said axis to align the bulk of the fibers in said mass along arcuate lines about said axis, and passing the material from substantially the entire inner periphery of said body in a direction normal to the radius of said body and parallel to said axis to form a long thin wall tubular casing about said axis.

KRISTIAN SCHULTZ.